United States Patent Office 2,838,562
Patented June 10, 1958

2,838,562

(BICYCLOHEXYL)-4-AMINE SALTS OF THE 4-CYCLOHEXYL-CYCLOHEXANE CARBAMIC ACIDS

Harry F. Brust, Midland, Mich., assignor to The Dow Chemical Company, Midland, Mich., a corporation of Delaware No Drawing. Application February 7, 1957
Serial No. 638,672

2 Claims. (Cl. 260—501)

The present invention is directed to the (bicyclohexyl)-4-amine salts of the 4-cyclohexylcyclohexane carbamic acids having the formula

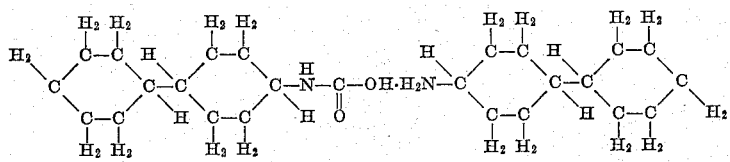

These new compounds are somewhat soluble in many organic solvents and of very low solubility in water. They have been found to be active as parasiticides and are adapted to be employed as active toxic constituents of compositions for the control of many pests such as *Alternaria solani*.

The new compounds may be prepared by reacting carbon dioxide with bicyclohexyl-4-amine. The reaction is carried out in the presence of an organic solvent inert under the conditions of reaction such as toluene, benzene, dioxane or diethyl ether. The reaction is somewhat exothermic and takes place smoothly at the temperature range of from $-10°$ to $75°$ C. The temperature may be controlled by regulation of the rate of contacting the reactants and by external cooling. Good results are obtained when at least one molecular proportion of carbon dioxide is employed with two molecular proportions of bicyclohexyl-4-amine.

In carrying out the reaction, the (bicyclohexyl)-4-amine is dissolved in the reaction solvent and gaseous carbon dioxide slowly passed into the solvent solution at a temperature from $-10°$ to $75°$ C. During the addition, the desired product precipitates in the reaction mixture as a crystalline solid. Upon completion of the reaction as is evidenced by the cessation of the precipitation of further product, the product may be recovered by conventional methods and thereafter purified by recrystallization from suitable organic solvents.

The (bicyclohexyl)-4-amine employed as a starting material in the present invention occurs in two isomeric forms known as the alpha and beta isomers. These two isomers may be prepared by known methods. In such methods, 4-cyclohexylcyclohexanol is dehydrogenated over a copper catalyst at $300°$ C. to form 4-cyclohexylcyclohexanone, and this product thereafter ammoniated to form a 4-cyclohexylcyclohexanone imine. The latter is thereafter hydrogenated over a nickel catalyst at $60°$ C. and 75 pounds pressure per square inch to give a reaction mixture containing about equal amounts of the alpha and beta isomers of (bicyclohexyl)-4-amine. The hydrogen chloride salt of the beta isomer of the amine is soluble in chloroform while the hydrogen chloride salt of the alpha isomer of the amine is substantially insoluble in chloroform. Thus, the isomeric amines may be separated in the form of their hydrogen chloride salts, and the salts thereafter converted to the free amine. The hydrogen chloride salts of the alpha and beta isomers of the amine melt at $295°–300°$ C. and $228°–232°$ C., respectively, while the alpha isomer of the amine melts at $58°–62°$ C. and the beta isomer of the amine melts at $32°$ C.

The following examples illustrate the invention but are not to be construed as limiting:

*Example 1.—(Bicyclohexyl)-4-amine salt of 4-cyclohexylcyclohexanecarbamic acid α-isomer*

1.5 moles of gaseous carbon dioxide was slowly bubbled into a solution containing 10 grams (0.0553 mole) of (bicyclohexyl)-4-amine α-isomer in 100 milliliters of diethyl ether. The addition was carried out with stirring and cooling and at a temperature of $0°$ C. During the addition, a (bicyclohexyl)-4-amine salt of 4-cyclohexylcyclohexanecarbamic acid α-isomer product precipitated in the reaction mixture as a white crystalline solid. Toward the end of the addition, no further substantial amounts of product precipitated in the reaction mixture. The product was thereafter separated by filtration, dried and found to melt at $104°$ C. with some slight decomposition.

*Example 2.—(Bicyclohexyl)-4-amine salt of 4-cyclohexylcyclohexanecarbamic acid β-isomer*

1.5 moles of carbon dioxide is slowly bubbled into a solution of 10 grams (0.0553 mole) of (bicyclohexyl)-4-amine β-isomer in 100 milliliters of diethyl ether. The addition is carried out with stirring and cooling and at a temperature of $0°$ C. During the addition, a (bicycloheyxl)-4-amine salt of 4-cyclohexylcyclohexanecarbamic acid β-isomer precipitates as a white crystalline solid. Toward the end of the addition, no further substantial amounts of product precipitates in the reaction mixture. The product is thereafter separated by filtration and dried. (Bicyclohexyl)-4-amine salt of 4-cyclohexylcyclohexanecarbamic acid β-isomer has a molecular weight of 406.

The new (bicyclohexyl)-4-amine salts of 4-cyclohexylcyclohexanecarbamic acid are effective as parasiticides for the control of many common pests. For such use, the products may be dispersed on an inert finely divided solid and employed as dusts. Also, such mixtures may be dispersed in water with the aid of a wetting agent, and the resulting aqueous suspensions employed as sprays. In other procedures, the products may be employed as constituents of oil-in-water emulsions or water dispersions with or without the addition of wetting, dispersing or emulsifying agents. In representative operations, 100 percent controls of tomato early blight (*Alternaria solani*) have been obtained with aqueous spray compositions containing 0.5 pound of the (bicyclohexyl)-4-amine salt of 4-cyclohexylcyclohexanecarbamic acid α-isomer per 100 gallons of ultimate mixture.

I claim:
1. A (bicyclohexyl)-4-amine salt of 4-cyclohexylcyclohexanecarbamic acid.
2. (Bicyclohexyl)-4-amine salt of 4-cyclohexylcyclohexanecarbamic acid α-isomer.

No references cited.